O. C. McCUNE.
Seed-Planter.
No. 43,699. Patented Aug. 2, 1864.
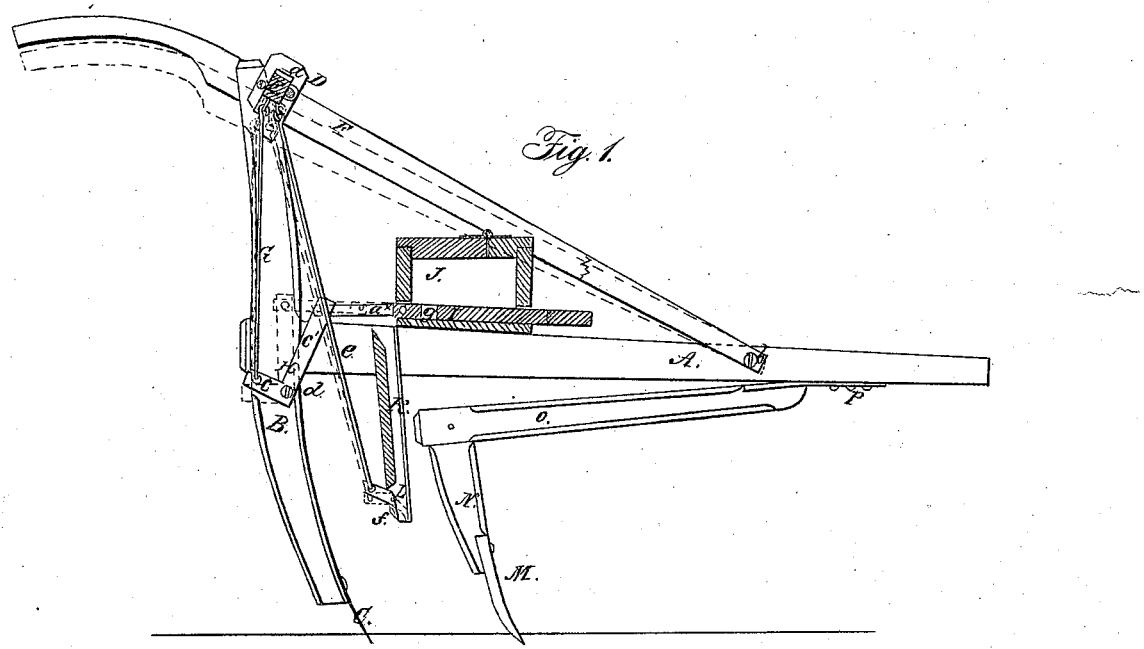
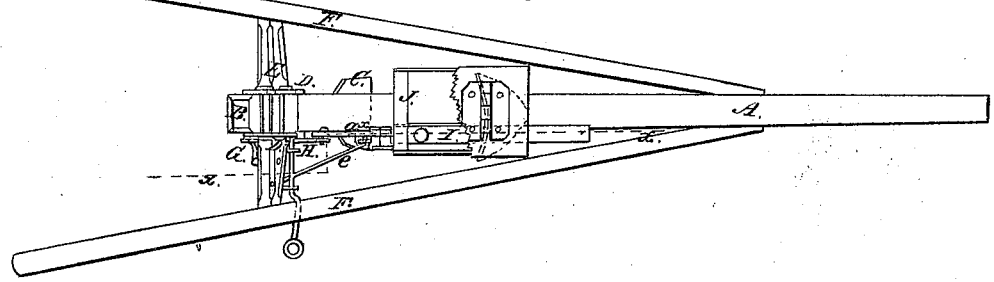
Witnesses:
Inventor:

UNITED STATES PATENT OFFICE.

O. C. McCUNE, OF PLEASANT VALLEY, OHIO.

CORN-PLANTER.

Specification forming part of Letters Patent No. 43,699, dated August 2, 1864.

*To all whom it may concern:*

Be it known that I, O. C. McCUNE, of Pleasant Valley, Darby Creek, in the county of Madison and State of Ohio, have invented a new and Improved Corn-Planter; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same.

Similar letters of reference indicate corresponding parts in the two figures.

This invention relates to a new and improved corn-planter of that class in which the seed-dropping mechanism is operated by the attendant while grasping the handles of the machine and guiding the same as it is drawn along.

The invention consists in connecting the seed-dropping mechanism with the handles of the machine and arranging the former in such a manner that the seed may be dropped by moving or actuating the handles, thereby enabling the attendant to drop the seed with the greatest facility while guiding the machine.

The invention further consists in a novel manner of attaching the furrow-share to the implement, whereby the former is allowed to yield or give and pass over obstructions without being liable to be broken.

To enable those skilled in the art to fully understand and construct my invention, I will proceed to describe it.

A represents a beam to which the draft-animals are attached, and B is a standard into which, at about its center, the back end of the beam is framed and permanently secured. To the lower end of the standard B a covering-share, C, is attached, and to the upper end of said standard there are secured two inclined plates, D D, one at each side, said plates having slots $a$ made longitudinally in them, one in each, and in which a horizontal bar, E, is fitted and allowed to work freely up and down.

The bar E connects the two handles F F of the machine, the front ends of the handles being attached by screws $b$ to the beam A, one to each side of the latter. The handles are allowed to work freely on the screws $b$, so as to admit of the back parts of the handles being raised and lowered, the bar E in the slots $a$ limiting said movement and serving as a guide for said handles. The bar E is connected by a rod, G, with one arm, $c$, of a right-angle lever, H, which is secured by a fulcrum-pin, $d$, to one side of the standard B. To the other arm, $c'$, of the lever H a seed-slide, I, is connected by a link, $a^*$. This seed-slide I passes through the lower part of a seed-box, J, which is placed on the beam A a short distance in front of the standard B.

K represents a seed-conveying tube, which is attached to the beam A at the rear of the seed-box J, extends down some distance below it, and has a valve, L, in its lower part, said valve being connected by a rod, $e$, with the bar E, as shown clearly in Fig. 1. This valve L works on a rod or pin, $f$, which passes horizontally through the lower part of the tube K.

The seed-slide I is arranged in the same way as those now generally used in corn-planters, said slide having a hole, $g$, made through it, which hole, when in the seed-box, becomes filled with seed, and when drawn out brings, of course, the seed with it, the seed falling into the tube K, which conducts it to the furrow.

M represents the furrow-share, which is attached to a standard, N, at the back part of a beam, O, the front end of the latter being secured to an elastic plate, P, which is attached to the under side of the beam A. This elastic plate P admits of the furrow-share yielding or giving in case it meets with any obstructions, and enables said share to pass over obstructions without danger of being broken.

As the machine is drawn along the attendant guides it by grasping the handles F F, and the seed is dropped at the desired points by the attendant, who raises and lowers the back ends of the handles F for that purpose, the slide I being shoved forward, so that its hole $g$ will pass within the seed-box J when the handles F are raised, and said hole being drawn out from the seed-box, so as to drop the seed when the handles are depressed or forced down.

The valve L serves to cause the seed to be dropped from the lower end of the tube K, said valve being closed when the hole $g$ of the slide I is drawn outward from the seed-box, so as to catch or retain the seed in tube K, and opened when the hole of the slide is shoved into the seed-box, so as to allow the seed to escape.

I do not claim the seed-slide I in the seed-box J, nor the valve L in the tube K, for those devices are old and well known; but,

Having thus described my invention, what I do claim as new, and desire to secure by Letters Patent, is—

1. Operating the seed-slide I through the medium of the handles F F, the latter being connected to the former, and all arranged substantially as and for the purpose herein set forth.

2. Operating the valve L in the tube K through the medium of the handles F F, substantially as set forth.

3. Attaching the furrow-share M to a beam, O, which is connected by an elastic plate, P, to the main beam A of the machine, all arranged substantially as and for the purpose herein set forth.

O. C. McCUNE.

Witnesses:
W. P. ANDREWS,
PHILLIP SNYDER.